United States Patent
Svensson et al.

(10) Patent No.: US 8,788,143 B2
(45) Date of Patent: Jul. 22, 2014

(54) METHOD FOR TESTING HYDRAULIC BRAKING SYSTEMS IN VEHICLES

(71) Applicant: Ford Global Technologies, LLC, Dearborn, MI (US)

(72) Inventors: Thomas Svensson, Leichlingen (DE); Rudolf Daniels, Wermelskirchen (DE); Ian Moore, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/892,333

(22) Filed: May 13, 2013

(65) Prior Publication Data

US 2013/0304313 A1    Nov. 14, 2013

(30) Foreign Application Priority Data

May 14, 2012 (DE) .......................... 10 2012 208 038

(51) Int. Cl.
  *B60T 17/22* (2006.01)
(52) U.S. Cl.
  CPC .................................. *B60T 17/221* (2013.01)
  USPC ....................................................... 701/34.4
(58) Field of Classification Search
  CPC .............................. B60T 17/222; B60T 8/172
  USPC ....................................................... 701/34.4
  See application file for complete search history.

(56) References Cited

U.S. PATENT DOCUMENTS

| | | | | |
|---|---|---|---|---|
| 4,946,230 A * | 8/1990 | Sakamoto et al. | ......... | 303/113.1 |
| 5,060,703 A * | 10/1991 | Koerner | .......................... | 141/59 |
| 6,119,059 A * | 9/2000 | Tai et al. | ...................... | 701/31.9 |
| 6,125,319 A * | 9/2000 | Hac et al. | ........................ | 701/80 |
| 6,179,392 B1 * | 1/2001 | Baechle et al. | ............ | 303/113.1 |
| 6,193,031 B1 * | 2/2001 | Baechle et al. | ............... | 188/352 |
| 7,308,350 B2 * | 12/2007 | Brown et al. | ................... | 701/70 |
| 7,344,206 B2 * | 3/2008 | Schmidt et al. | ............... | 303/191 |
| 7,374,253 B2 * | 5/2008 | Buschmann et al. | .... | 303/122.08 |
| 7,461,906 B2 * | 12/2008 | Baechle et al. | ................ | 303/11 |
| 8,573,712 B2 * | 11/2013 | Bachle et al. | ............. | 303/119.1 |
| 8,641,152 B2 * | 2/2014 | Pursifull et al. | ........... | 303/114.1 |
| 2008/0018172 A1 * | 1/2008 | Bachle | ............................ | 303/11 |
| 2008/0255743 A1 * | 10/2008 | Tanaka et al. | ................... | 701/70 |
| 2009/0091180 A1 * | 4/2009 | Iwasaki et al. | .................. | 303/11 |

* cited by examiner

*Primary Examiner* — Thomas Tarcza
*Assistant Examiner* — Alex C Dunn
(74) *Attorney, Agent, or Firm* — Joseph E. Root

(57) ABSTRACT

A method for testing a hydraulic braking system. The method includes activating a brake master cylinder of the braking system mechatronically, and measuring a set of measured decision ratios pertaining to the distance travelled by the piston of the brake master cylinder to the corresponding pressure developed in the brake fluid. The measured decision ratios are then compared with a set of reference decision ratios. In a case where the measured decision ratios lie within a predetermined range, it is detected that the braking system is correctly filled with the brake fluid. However, in a case where the measured decision ratios lie outside the predetermined range, it is determined that the braking system has not been correctly filled with the brake fluid and some air is present in the brake fluid flow circuit of the braking system.

6 Claims, 1 Drawing Sheet

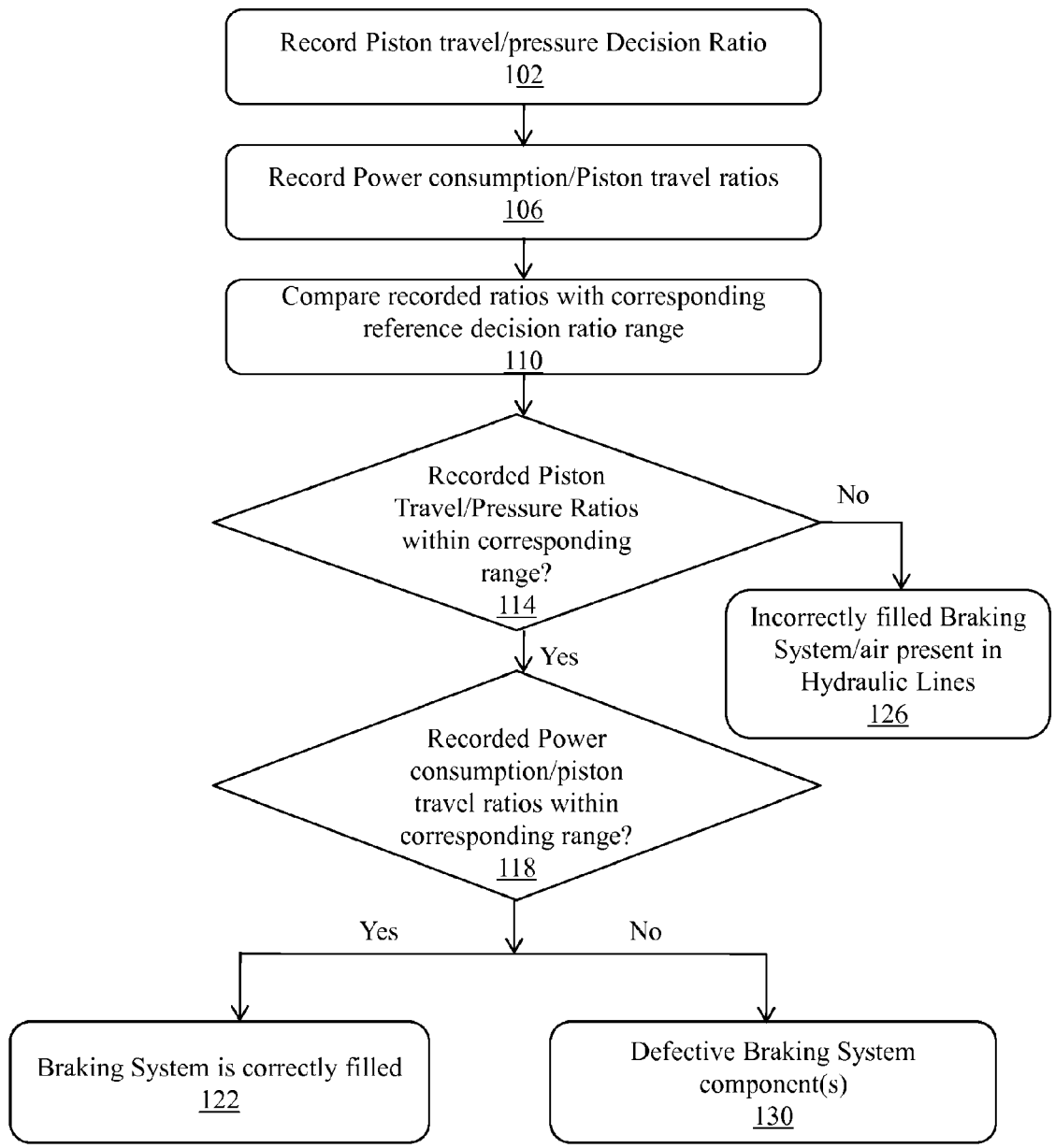

METHOD FOR TESTING HYDRAULIC BRAKING SYSTEMS IN VEHICLES

TECHNICAL FIELD

Embodiments of the present disclosure generally relate to braking systems for automotive vehicles, and, more specifically, to methods and systems for testing hydraulic braking systems incorporated in automotive vehicles.

BACKGROUND

Many currently manufactured vehicles incorporate hydraulic braking systems, and those systems use a brake fluid to transmit pressure from the controlling mechanism to the braking mechanism of a vehicle. A hydraulic braking system generally includes a brake pedal or brake lever, a push rod (known as the actuating rod) having an end connected to the brake pedal, a brake master cylinder having a piston assembly connected to the push rod, and a brake caliper assembly having brake pads and a rotor/drum attached to an axle of the vehicle. The working brake fluid is generally ethylene glycol, though alternative suitable fluids are also used.

During operation of a hydraulic braking system, as the brake pedal is pressed, the push rod exerts a force on the piston of the master cylinder, which causes brake fluid to flow out from a brake fluid reservoir to the hydraulic lines of the braking system. That action increases pressure in the brake lines, which in turn forces pads on the brake calipers to close against a spinning rotor, generating a braking torque. Similarly, as the brake pedal is released, the piston of the brake master cylinder retracts to its original position, which relieves the pressure on the brake caliper pistons, thus, eventually releasing contact of the brake pads with the rotor.

If air is present in the brake fluid circuit, as will happen if the braking system is not accurately filled with brake fluid, the driver may experience a spongy brake pedal sensation while applying the brakes. In such cases, depending on the volume of air present in the braking system, the brake pedal or the brake lever may be even pushed to the stop without experiencing much resistance. To address this problem, the air present in the hydraulic lines must be evacuated.

When a vehicle is manufactured, the braking system is generally tested using a "pedal checker", which measures the distance travelled by the activation device (i.e., the brake pedal or the brake lever) with respect to the activation force required to achieve the distance travelled. A pedal checker is an external device installed within a suitable portion of a vehicle, such as the seat rail. While testing braking systems of multiple vehicles assembled and manufactured in series along an assembly line, testing the hydraulic braking system of each of those vehicles through a pedal checker is cumbersome, as it may consume considerable amount of time to mount the pedal checker within each of those vehicles. Further, the sum of the mounting time for the pedal checker and the time consumed in recording test values for each vehicle (i.e., the pedal travel distance and the pedal force applied) should be synchronized with the cycle time of the vehicles at the assembly line, which is another problem. Another major disadvantage of a pedal checker is its unsuitability for use in repair facilities, due to the complexity of installation.

Considering the problems mentioned above, and other shortcomings in the art, there exists a need for a more effective method of testing the hydraulic braking system incorporated in a vehicle.

SUMMARY

The present disclosure provides a method for identifying whether the hydraulic braking system of a vehicle incorporating the same is accurately filled with the brake fluid.

According to an aspect, the disclosure provides a method for testing a hydraulic braking system incorporated in a vehicle. The braking system includes a brake master cylinder that can be activated mechatronically, having at least one piston. The method includes activating the brake master cylinder and measuring a set of measured decision ratios. Those measured decision ratios are then compared with a set of reference decision ratios. A predetermined range of reference decision ratios is defined about the reference decision ratios. It is then concluded whether the braking system is correctly or incorrectly filled with the brake fluid depending on whether the measured decision ratios lie within or outside the predetermined range of reference decision ratios.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

FIG. 1 is a flowchart illustrating an exemplary method for testing the hydraulic braking system of a vehicle, according to an embodiment of the present disclosure.

DETAILED DESCRIPTION OF ILLUSTRATIVE EMBODIMENTS

The following detailed description illustrates aspects of the disclosure and its implementation. This description should not be understood as defining or limiting the scope of the present disclosure, such definition or limitation being solely contained in the claims appended thereto. Although the best mode of carrying out the invention has been disclosed, those in the art would recognize that other embodiments for carrying out or practicing the invention are also possible.

A hydraulic braking system for a vehicle works on the principle of increasing pressure in the brake fluid circuit of the system, and utilizing the force of the high pressure brake fluid to push brake pads against a spinning rotor, causing a braking torque. Specifically, the driver depresses a brake pedal, connected to an actuation rod to push the piston of the brake master cylinder. That action forces brake fluid out of a fluid reservoir and into the brake caliper assembly. There, the brake caliper pistons push the brake pads, bringing the pads in contact with a rotor, to affect braking of the vehicle.

In a case where the brake fluid circuit is partially filled with air, the driver may experience a spongy brake pedal feel when activating the brake pedal/brake lever. When the brake lines are properly filled, the distance travelled by the brake pedal is proportional to the amount of activation force applied. When air is present in the brake lines, however, the brake pedal can travel a long distance without experiencing substantial resistance, because the air, unlike the brake fluid, is compressible.

The present disclosure provides an efficient method for testing a vehicle braking system to detect the presence of air in a brake line. In addition to conventional components of a brake system, such as the brake lines, the present disclosure includes a brake master cylinder that can be activated mechatronically. As used here, "mechatronic" refers to the interaction between mechanical, electronic, and information technology elements, including mechanical devices, electronic components, and information technology modules. A typical mechatronic system may include sensors for acquiring the value of system variables, actuators for performing control actions, and a processor system for processing information and generating control outputs.

It should be noted initially that the testing method set out in the present disclosure can be performed at the factory or in a workshop without any dismantling of the vehicle under test. Unlike the conventional test method, in which a seat must be removed in order to install a "pedal checker," the entire method of the present disclosure can be initiated and controlled through the vehicle's onboard computer system.

A test cycle begins by activating the brake master cylinder and recording, certain decision ratios. These ratios are compared with a set of reference decision ratios stored in a memory unit. In a case where the recorded decision ratios lie within a predetermined range defined by a maximum and a minimum values, then one can conclude that the braking system is appropriately filled—that is, no air is present in the brake line. Where the actual ratios lie outside the predetermined range one can conclude that at least some air is present in the brake line. In such case, the brake master cylinder is activated with a diagnostic command and the brake fluid circuits are opened to vent/discharge the trapped air.

Specifically, depressing the brake pedal causes an actuating rod (i.e., the push rod) to similarly depress the brake master cylinder piston. That action increases pressure in the brake lines. A relationship can be derived between the distance travelled by the moving piston and the pressure developed in the brake fluid. That parameter, referred to as the measured decision ratio, is the ratio of the distance travelled by the piston of the brake master cylinder to the pressure built in the brake fluid. In a preferred embodiment, multiple values of the measured decision ratio are recorded, at different instants, with the piston at different points within its span of travel. For greater accuracy, sets of measured decision ratios can be obtained several times. For example, in certain cases, knocking may occur in the brake caliper pistons, in instances where piston travels a relatively long distance without substantially increasing substantial brake fluid pressure. Measurements in that situation would be erroneous, and such errors may be avoided, by measuring the decision ratios twice or more.

Once the multiple measured decision ratio values have been obtained and recorded, those values may be plotted to generate a corresponding curve. That curve may then be compared to a curve plotting the reference decision ratios, allowing one to determine whether the braking system of the vehicle has been correctly filled with the brake fluid.

The reference decision ratios represent system performance when the brake lines are correctly filled. These reference ratios may be pre-recorded, and may be based on certain parameters of the hydraulic braking system, and thus the set of reference ratios may be different for different types of vehicles. Based upon the performance requirements for the brake system, maximum and minimum reference decision ratio defined a range of acceptable decision ratios. In a preferred embodiment, for example, the limiting maximum values may be 85-90% higher than the reference decision ratios, and similarly, the limiting minimum value may be about 85-90% lower than the reference decision ratios.

The decision whether a specific brake system under test is acceptable results from a comparison between the major decision ratio and the applicable reference decision. A central control unit performs those calculations and comparisons. A decision whether or not a given brake system passes the test depends upon whether the major decision ratios fall within the acceptable range of reference decision ratios.

Where a brake system fails the test of the present disclosure, the braking system circuits are opened to purge the trapped air. Once the process is complete, the braking system is refilled and retested.

In an alternative embodiment, a second set of measured decision ratios may be obtained and recorded for comparison with a second set of reference decision ratios. The measured decision ratios in the second set are the ratios of the power consumed by an actuator for the brake master cylinder (i.e., the actuating rod) to the distance travelled by the piston of the brake master cylinder at different instants. Multiple values of the second decision ratios are recorded corresponding to different positions of the piston within the brake master cylinder. Further, corresponding to a specific position of the piston within the brake master cylinder, the decision ratio of the power consumed to the distance travelled can be recorded twice or more, to obtain a more precise and accurate value and to avoid any possible errors.

Once the second set of decision ratios has been recorded, those values are compared with a set of reference ratios. Limiting maximum and minimum values are assigned to the reference ratios, defining a range of reference decision ratios. If the second measured decision ratios are found to be within the range of reference decision ratios, it is concluded that the braking system is correctly filled.

There may be case where the first set of measured decision ratios, i.e., the ratios of the distance travelled by the piston to the pressure built up in the brake fluid, may lie well within their corresponding range of reference decision ratios, but, the second set of measured decision ratios, i.e., the ratio of the power consumed to the distance travelled by the piston of the brake master cylinder, may lie outside the corresponding range of reference decision ratios they are compared to. In such a case, it is concluded that the braking system of the vehicle has been correctly filled with the brake fluid, but there is a defect in one or more components of the braking system of the vehicle, such as the brake master cylinder or the actuator of the brake master cylinder. During such situations, the corresponding defective unit is checked for fault, and may be eventually replaced.

FIG. 1 is a flowchart illustrating the steps involved in the method of the present disclosure. As shown, at step 102, the system measures and records the first set of measured decision ratios as quotients of the distance travelled by the piston of the brake master cylinder and the corresponding pressure developed in the brake fluid. As noted earlier, multiple values of the first decision ratios are recorded, to avoid any possible errors. At step 106, a second set of decision ratios are measured and recorded as quotients of the power consumed by the actuator for the brake master cylinder and corresponding distance travelled by the piston.

At step 110, the method carries out a comparison of the measured first and second measured decision ratios with corresponding reference decision ratios. At step 114, it is checked whether the piston travel to pressure decision ratios (i.e., the first measured decision ratios) lie within the predetermined range about the corresponding reference decision ratios. If not, then the method concludes at step 126 that the braking system of the vehicle is incorrectly filled with the brake fluid, and some air is present in the brake fluid flow circuit. If yes, then the method proceeds to step 118, where it checks whether the power consumption to piston travel ratios (i.e., the second measured decision ratios) lie within the corresponding reference range of decision ratios they were compared with, at step 110 earlier.

If both the first and the second set of measured decision ratios lie well within their respective reference ranges, then at step 122, the method ends by concluding that the braking system has been correctly filled with the brake fluid, and there is no air present in the brake fluid circuit. Else, in a case where the first set of measured decision ratios lie within their reference decision ratio range, and the second set of measured decision ratios lie outside their reference decision ratio range, then at step 130, the method concludes that the braking system of the vehicle has been correctly filled with the brake fluid, but, there is a defect in one or more braking components of the vehicle, such as the brake master cylinder or the actuator for the brake master cylinder.

Among the interactive components of the hydraulic brake system are the brake pads (or linings), which are in contact with a brake disc (or brake drum). In certain cases, the brake pads may slide on the brake discs, causing an undesirably high level of wear of the components and increased fuel consumption. According to the method of the present disclosure, it is possible to identify whether the brake linings are at an appropriate distance from the brake discs, and whether the brake linings have worn out and need a replacement. The results of comparison of the first set of measured decision ratios (i.e., the ratio of the distance travelled by the piston of the brake master cylinder to the pressure built in the brake fluid) and the second set of measured decision ratios (i.e., the ratio of the power consumption to the distance travelled by the piston) with the respective ranges of reference decision ratios can be used to infer slippery or worn brake linings. Specifically, if both the first and the second set of measured decision ratios lie within their respective range of reference decision ratios, it is inferred that the brake linings are at a correct distance from the brake discs. On the other hand, if it is determined that a high pressure builds up in the brake fluid at low piston travel, or even if there is no piston travel, then slippery brake linings can be inferred. Further, in a case where the piston travel is too long for pressure build up, despite an air-free braking system, it is inferred that the brake linings are worn and need a replacement, since the distance between the brake linings and the brake discs is too long in that case.

According to an embodiment, it is possible to identify leakage within one or more components of the braking system of a vehicle, such as the brake master cylinder. To detect leakage, a leakage test is carried out, which includes measuring the pressure within the brake master cylinder as a function of time. While operating the brake master cylinder mechatronically, the different components of the braking system can be tested individually, by actuating or closing the inlet valves of braking system on each wheel. A set of decision ratios are recorded as a quotient of the amount of pressure drop in the brake fluid as a function of time. Those recorded decision ratios are then compared with a set of reference decision ratios for pressure drop to time lapsed. Limiting maximum and minimum values are then assigned to the reference pressure/time decision ratios, and it is checked whether the measured pressure/time decision ratios lie within the limiting values about the reference pressure to time decision ratios, to detect leakage within the different components of the braking system. In a case where all the inlet valves for the brake fluid of the braking system are closed and a pressure drop in the brake fluid is still detected, it is inferred that either there is an internal leakage in the brake master cylinder, or the brake master cylinder is defective. In such a case, the brake master cylinder can either be replaced completely, or the corresponding leakage can be sealed, as the case may be.

One advantage of the method of the present disclosure is that there is no need of any external 'pedal checker' to be installed in the vehicle, for checking the braking system. Further, over an assembly line, all the vehicles can be easily tested using the method, without affecting the manufacturing cycle time of the assembly line. Therefore, the need to examine different vehicles individually on a sample basis can be ruled out.

The method of the present disclosure can be implemented for any type of vehicle incorporating a hydraulic braking system and having brake master cylinder configured to be operated mechatronically. Examples of such vehicles may include cars, trucks, SUVs, etc. Further, the method is highly efficient and accurate in detecting presence of even small volumes of air in a brake circuit. The same method can be easily used to test different vehicles separately, and the method does not affect the manufacturing cycle time of different vehicles along an assembly line. However, the reference decision ratios used for comparison, as mentioned earlier, may vary based on certain parameters of the braking system, and hence, may be different for different vehicles.

Although the current invention has been described comprehensively, in considerable details to cover the possible aspects and embodiments, those skilled in the art would recognize that other versions of the invention are also possible.

What is claimed is:

1. A method for testing a vehicle braking system, the braking system having a brake master cylinder adapted to be activated mechatronically, the method comprising:
    activating the brake master cylinder;
    measuring and recording a first set of measured decision ratios as a quotient of the distance travelled by a piston of the brake master cylinder and a corresponding pressure developed in the brake fluid of the braking system with respect to the piston's travel, and comparing the first set of measured decision ratios with a first set of reference decision ratios;
    measuring and recording a second set of measured decision ratios as a quotient of the power consumed by an actuator of the piston of the brake master cylinder and the distance travelled by the piston, and comparing the second set of measured decision ratios with a second set of reference decision ratios;
    detecting whether the first set of measured decision ratios lie within a range defined by the first set of reference decision ratios, and whether the second set of measured decision ratios lie within a range defined by the second set of reference decision ratios; and
    concluding a defect in one or more components of the braking system of the vehicle if the second set of measured decision ratios lie outside the predetermined range about the second set of reference decision ratios, and if the first set of measured decision ratios lie within the predetermined range about the first set of reference decision ratios.

2. The method of claim 1, further comprising:
    measuring and recording a plurality of measured decision ratios at different instants;
    generating a measured decision ratio curve corresponding to the plurality of measured decision ratios;
    comparing the measured decision ratio curve with a reference decision ratio curve plotted using the reference decision ratios; and
    concluding that the braking system is incorrectly filled with the brake fluid if the measured decision ratio curve deviates from the reference decision ratio curve.

3. The method of claim 2, further comprising:
concluding that the braking system is correctly filled with the brake fluid if the measured decision ratios are within the predetermined range of reference decision ratios; and
concluding that the braking system is incorrectly filled with the brake fluid if the measured decision ratios lie outside the range of reference decision ratios.

4. A method for testing a vehicle braking system, the braking system having a brake master cylinder adapted to be activated mechatronically, the method comprising:
activating the brake master cylinder;
measuring and recording a set of decision ratios related to the brake master cylinder;
comparing the measured decision ratios with a set of reference decision ratios stored in a memory unit; and
determining whether the braking system is correctly or incorrectly filled with brake fluid based on whether the measured decision ratios lie inside or outside the range of reference decision ratios;
wherein the braking system includes brake pads and brake disks, the brake pads being configured to be in contact with the brake discs, the method further comprising, detecting a correct distance between the brake pads and the brake discs if the measured decision ratios are within the predetermined range about the reference decision ratios.

5. The method of claim 4, wherein the measured decision ratios are one of a quotient of the distance travelled by a piston of the brake master cylinder and the corresponding pressure developed in the brake fluid of the braking system, and a quotient of the power consumed by an actuator of the brake master cylinder and the distance travelled by the piston of the brake master cylinder.

6. The method of claim 1, further comprising:
measuring and recording pressure to time ratios corresponding to pressure developed in the brake fluid of the braking system to the time lapsed, and comparing the measured pressure to time ratios with a set of reference pressure to time ratio; and
detecting a leakage of the brake fluid within the braking system if the measured pressure to time ratios lie outside a range defined by the reference pressure to time ratios.

* * * * *